Figure 1:
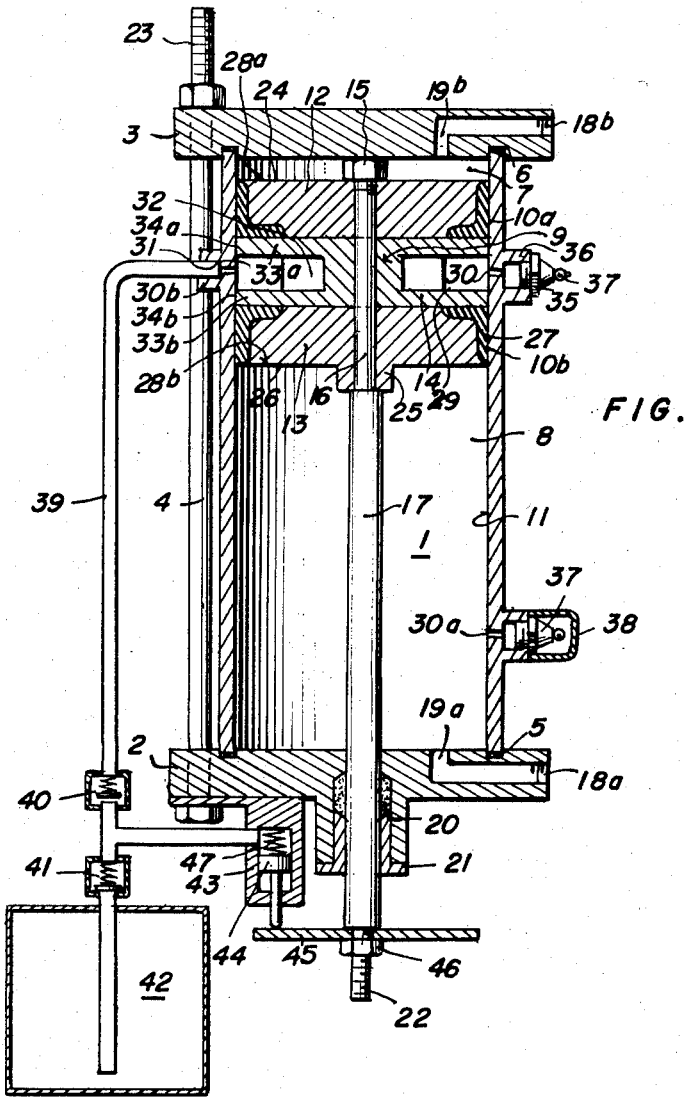

July 15, 1958  N. R. ANDERSON  2,843,220
GREASE-LUBRICATED AIR POWER CYLINDER

Filed July 8, 1954

INVENTOR:
NEVILLE RUPERT ANDERSON,

BY

ATTORNEY.

2,843,220
GREASE-LUBRICATED AIR POWER CYLINDER

Neville Rupert Anderson, Edgecliff, New South Wales, Australia

Application July 8, 1954, Serial No. 442,097

Claims priority, application Australia July 20, 1953

11 Claims. (Cl. 184—18)

The present invention has reference to improvements in or relating to grease charged air power cylinders of the type in which periodical recharging of the cylinder with grease is only necessary at comparatively infrequent intervals. It provides a grease charged air power cylinder having a grease storage space located between peripheral packings in the piston, a grease storage space located between the piston at the end of full stroke and the adjacent cylinder head, an aperture in the cylinder wall on the path of the piston, said aperture being communicated with said spaces one at a time by movement of the piston, and said aperture being connected to a grease inlet through which said spaces are periodically charged with grease.

Figure 2:
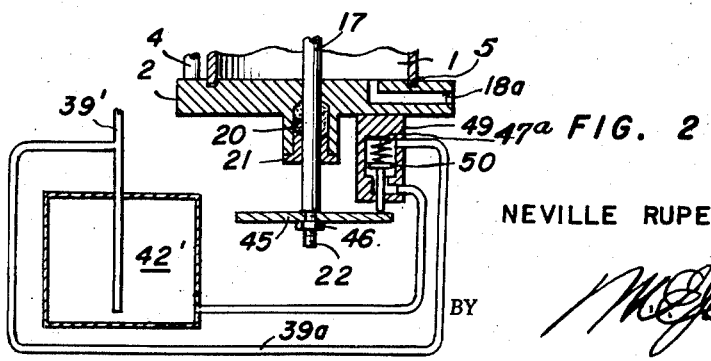

Other objects and improvements will appear from the following description, taken in connection with the drawing, which illustrates the invention by way of example and in which:

Figure 1 is a longitudinal cross section through one form of this invention as applied to a double acting pneumatic power cylinder. In plan the unit is circular and need not be illustrated for the purpose of explaining the present invention, and Figure 2 is a fragmentary longitudinal cross section through a modified form of the invention as applied to a double action pneumatic power cylinder.

In Figure 1 a cylindrical chamber 1 has end enclosing means consisting of a gland cylinder head 2 and a blind cylinder head 3 held together by a plurality of tie rods similar to tie rod 4, an air-tight joint being formed at the heads 2 and 3 by gaskets 5 and 6.

The chamber 1 is divided into an upper compartment 7 and a lower compartment 8 by a piston 9 having piston cups 10a and 10b which maintain substantially air-tight contact with the inner face 11 of the chamber 1 while the piston 9 travels between the heads 2 and 3 in an axial or longitudinal direction.

The piston cups 10a and 10b are clamped by an upper piston disc 12 and a lower piston disc 13 to a piston center piece 14 in a fluid-tight manner by a piston rod nut 15 located on a reduced end 16 of a piston rod 17.

The gland cylinder head 2 contains a threaded inlet port 18a communicating with an air handling port 19a in the end of the lower compartment 8 and the blind cylinder head 3 contains a threaded inlet port 18b communicating with an air handling port 19b in the end of the upper compartment 7.

The piston rod 17 passes in a substantially air-tight manner through a packing 20 and a gland nut 21 in the gland cylinder head 2, the external end of the piston rod 17 being provided with a thread 22 for attaching to the load, some of the tie rods 4 having extended threads 23 for securing the cylinder in position.

In Figure 1 the piston 9 is shown at the top end of its full stroke or travel and in this position it will be noted that, as the piston rod nut 15 acts as a spacer by projecting appreciably beyond the top disc face 24, the upper compartment 7 forms space for a substantial quantity of grease swept along by the piston 9 on its upward stroke towards the blind cylinder head 3; it will be similarly understood that, as a boss 25 acts as a spacer by projecting appreciably beyond the bottom disc face 26, the lower compartment 8 forms space for a substantial quantity of grease swept along by the piston 9 on its downward stroke towards the gland cylinder head 2.

The piston 9 has a lubricated peripheral surface 27 extending from the upper leading edge 28a of the upper piston cup 10a to the lower leading edge 28b of the lower piston cup 10b, said surface 27 containing space 29 which is chargeable with a substantial quantity of grease through a hole 30 in the inner face 11, when the piston 9 is slid into a position which connects said hole 30 with said space 29, as illustrated in Figure 1.

The space 29 comprises a slot 31 extending around the periphery of the piston 9, the bottom of said slot 31 having radially disposed webs 32 strengthening the end walls 33a and 33b of the center piece 14, the peripheral areas 34a and 34b of said walls forming rigid portions tending to keep the piston 9 centered on the longitudinal axis of the chamber 1.

It will be noted that areas 34a and 34b are adjacent to the space 29 so that there is ample flow of grease to said areas, and it will also be noted that the areas 34a and 34b are separated by the piston cups 10a and 10b from the air being handled, thus giving protection from abrasive matter in said air.

The hole 30 is a fine aperture, or plurality of very fine apertures, so that the leading edges 28a and 28b are able to slide over easily without getting caught; a second hole 30a is provided in the corresponding position to the hole 30 but at the opposite end of the chamber 1, so that the space 29 may be charged with grease when the piston 9 is adjacent to either the blind cylinder head 3 or the gland cylinder head 2.

It will be readily understood that, when the piston 9 is at the upper end of the chamber 1, as shown in Figure 1, grease may be charged through the second hole 30a at the opposite end directly into the lower compartment 8, which is of value in keeping the piston rod 17 lubricated and in providing a charge of grease which may be splashed about by the air in the air handling compartment 8; similarly the hole 30 permits direct charging of the upper air handling compartment 7 with grease, when the piston 9 moves so as to expose the said hole 30 to the upper compartment 7.

The hole 30 is connected to a lubricator comprising a nipple 35, such as a grease gun nipple of known pattern containing a spring loaded ball non-return valve to retard flow of air out of the cylinder, said nipple 35 being screwed into a pad 36 on the outside of the cylinder and having a surface 37 which is shaped to take a removable grease gun of known pattern capable of forcing grease through the said hole 30.

The second hole 30a is shown connected to a nipple of known pattern which is generally similar to nipple 35 but has a removable cover 38 capable of preventing escape of air or grease out of the chamber 1 through said hole 30a.

Under normal operating conditions, when using the correct grade of grease, as for instance a grade known as high pressure chassis lubricant, the cylinder retains sufficient grease to only periodically require recharging through the apertures, a not uncommon period amounting to some weeks. The cylinder described in this invention is thus self-lubricating by comparison with air cylinders using oil, which has to be fed in either continuously or at short intervals.

It will be understood also that the grease in the space located between the piston at the end of full stroke and the adjacent cylinder head, as for instance compartment 7 as illustrated in Figure 1, acts as a plastic filling to produce a high compression ratio without requiring fine clearances between said head and said piston.

An alternative way of supplying lubricant from the reservoir is shown in Figure 2, all parts unless modified by the following description, being the same as in Figure 1. An enlcosed vessel 42' is like or substituted for reservoir 42 in which the lubricant is subject to pressure of compressed air, and in this case the valves 40 and 41 and the pump are omitted and the duct 39' replacing that at 39, is circuitously connected by an extension conduit 39ᵃ to a valve body 49 containing a valve disc 50 having a spring 47ᵃ tending to keep said disc 50 closed against said body 49 until forced open by the piston rod disc 45 each time the piston 9 travels through the last portion of an upward stroke, during which period the valve is being pushed open and the storage space 29 is travelling opposite the hole 30ᵇ, thus permitting the air pressure in the reservoir 42 to force some lubricant into said space 29.

I claim:

1. In a grease-lubricated air power cylinder providing a chamber, a piston operable in said chamber, said piston having peripheral packings and between said packings space for a substantial quantity of grease, said chamber between the piston at the end of full stroke and the adjacent end of the chamber constituting additional space for grease, the wall of the chamber in the path of the piston having a fine aperture, said aperture being communicated with said spaces one at a time by movement of the piston, and grease inlet means with which said aperture is connected and through which said spaces are periodically charged with grease.

2. In a grease-lubricated air power cylinder providing a chamber, a piston operable in said chamber, said piston having peripheral packings and between said packings space for a substantial quantity of grease, said chamber between the piston at the end of full stroke and the adjacent end of the chamber constituting additional space for grease, the wall of the chamber in the path of the piston having a fine aperture, said aperture being communicated with said spaces one at a time by movement of the piston, and grease inlet means for said aperture capable of being periodically connected manually to a supply of grease under substantial pressure whereby said spaces are recharged with grease.

3. In a grease-lubricated air power cylinder providing a chamber, a piston operable in said chamber, said piston having peripheral packings and between said packings space for a substantial quantity of grease, said chamber between the piston at the end of full stroke and the adjacent end of the chamber constituting additional space for grease, the wall of the chamber in the path of the piston having a fine aperture, said aperture being communicated with said spaces one at a time by movement of the piston, and a grease nipple for said aperture through which said spaces are capable of being periodically recharged with grease by a detachable grease gun.

4. A grease-lubricated air power cylinder according to claim 3 wherein said grease gun is manually operated and said nipple has a removable cover.

5. In a grease-lubricated air power cylinder providing a chamber, a piston operable in said chamber, said piston having peripheral packings and between said packings space for a substantial quantity of grease, said chamber between the piston at the end of full stroke in each direction and the adjacent end of the chamber constituting additional spaces for grease, the wall of the chamber in the path of the piston near each end of the chamber having a fine aperture so located as to be opposite said space in the piston when the piston is near the corresponding end of full stroke, the piston being slidable clear of said apertures, and grease inlets for said apertures capable of periodically coupling said spaces to a source of grease which is at a pressure substantially higher than the pressure in said spaces.

6. In a grease-lubricated air power cylinder providing a chamber, a piston operable in said chamber, said piston having a lubricated peripheral surface, said surface being slidable longitudinally along the inner face of said chamber while maintaining substantially fluid-tight contact therewith, said face having a hole therein, said surface containing space which is chargeable with grease through said hole when the piston is slid into a position which connects said hole to said space, said chamber containing a clearance between the piston and the end of the chamber which is produced by a spacer, said clearance being chargeable with grease through said hole when the piston is slid into a position which connects said hole with said clearance.

7. In a grease-lubricated air power cylinder providing a chamber, a piston operable in said chamber, said piston having a lubricated peripheral surface in sliding contact with the inside wall of said chamber, said surface consisting of flexible packings and rigid portions, said packings separating said portions from each end of the chamber, said surface containing space for grease located between said rigid portions, said face having a hole therein, said space being periodically chargeable with grease through said hole, the chamber containing a clearance between part of the piston and the end of said chamber when the piston is at the corresponding end of full stroke, said clearance being periodically chargeable with grease through said hole.

8. In a grease-lubricated air power cylinder providing a chamber, a piston operable in said chamber, space for a substantial quantity of grease extending around the periphery of the piston, said chamber constituting additional space for grease between the piston at the end of full stroke and the adjacent end of the chamber, the wall of said chamber in the path of the piston having a fine aperture, said aperture being communicated with said spaces one at a time by movement of the piston, grease inlet means connected with said aperture through which said spaces are capable of being periodically charged with grease, packings of flexible material on the periphery of the piston, said space for grease in the piston being separated from each end of the chamber by said packings, the piston having rigid portions in sliding contact with the wall of the chamber and separated from each end of said chamber by said packings, the leading edge of said packings forming a squeegee whereby foreign matter which might enter the chamber is swept ahead of the piston.

9. In a grease-lubricated air power cylinder providing a chamber containing swept and unswept portions, a piston operable in said swept portion, peripheral packings in said piston, the piston having space for a substantial quantity of grease in said swept portion between said packings, the chamber providing space in said unswept portion for a substantial quantity of grease between the piston at the end of full stroke and the adjacent end of the chamber, a fine aperture in the wall of said swept portion, said aperture being communicated with said spaces one at a time by movement of said piston, and grease inlet means with which said aperture is connected and through which said spaces are periodically charged with grease.

10. In a grease-lubricated air power cylinder, a cylindrical chamber which contains a piston having a lubricated peripheral surface, said surface being slidable longitudinally along the inner face of said chamber while maintaining substantially air-tight contact therewith, said surface having space which is chargeable with grease through a hole in said face when said piston is slid into a position which connects said hole to said space; and said piston being also slidable into a position which exposes said hole to the interior of the chamber, thus permitting the charging of additional grease through said hole directly into said chamber.

11. A grease-lubricated air power cylinder according to claim 10 wherein an unswept portion at one or each end of said chamber serves to retain grease swept along by said piston in its movement.

References Cited in the file of this patent

UNITED STATES PATENTS

| 491,224 | Poore | Feb. 7, 1893 |
| 1,329,499 | Binkey | Feb. 3, 1920 |
| 1,347,959 | McGann | July 27, 1920 |

FOREIGN PATENTS

| 50,314 | Norway | Mar. 7, 1932 |